United States Patent
Hartlepp et al.

(10) Patent No.: US 6,259,967 B1
(45) Date of Patent: Jul. 10, 2001

(54) PARCEL SINGULATION SYSTEM

(75) Inventors: Karl Heinz Hartlepp, Ontario (CA); Brian Bruun, Hjortshoj (DK); Christopher Robert Matanin, Ellicott City, MD (US)

(73) Assignee: Crisplant a/s, Arhus N. (DK)

( * ) Notice: Subject to any disclaimer, the term of this patent is extended or adjusted under 35 U.S.C. 154(b) by 0 days.

(21) Appl. No.: 09/362,863

(22) Filed: Jul. 29, 1999

Related U.S. Application Data

(60) Provisional application No. 60/094,547, filed on Jul. 29, 1998.

(51) Int. Cl.$^7$ .............................. G06F 7/00; B65G 43/00; B65G 47/00; B65G 47/26
(52) U.S. Cl. ........................... 700/230; 198/444; 198/448
(58) Field of Search ..................................... 198/443, 444, 198/448, 452; 700/229, 230; 193/2 A, 2 C, 46

(56) References Cited

U.S. PATENT DOCUMENTS

| 5,147,023 | 9/1992 | Meindl . | |
|---|---|---|---|
| 5,222,586 | * 6/1993 | Ydoate et al. | 198/452 X |
| 5,638,938 | 6/1997 | Lazzarotti et al. | |
| 5,641,052 | 6/1997 | Lazzarotti et al. | |
| 5,701,989 | 12/1997 | Boone et al. | |
| 5,950,800 | * 9/1999 | Terrell et al. | 198/448 X |
| 5,984,498 | * 11/1999 | Lem et al. | 700/230 X |

FOREIGN PATENT DOCUMENTS

| 172060B1 | 10/1997 | (DK) . |
|---|---|---|
| 0310411 | 5/1989 | (EP) . |
| 0383673A1 | 8/1990 | (EP) . |
| 0422635A1 | 4/1991 | (EP) . |
| 0616961A1 | 9/1994 | (EP) . |
| 0780327A1 | 6/1997 | (EP) . |
| 0780328A1 | 6/1997 | (EP) . |
| 0795497A2 | 9/1997 | (EP) . |
| 0806383A1 | 11/1997 | (EP) . |
| 927296 | 5/1963 | (GB) . |
| 9011142 | 10/1990 | (WO) . |
| WO 99/03765 | 1/1999 | (WO) . |

OTHER PUBLICATIONS

Patent Abstradts of Japan, 6111491818, 1986–06–02, Nishizawa Hisatake

* cited by examiner

Primary Examiner—Christopher P. Ellis
Assistant Examiner—Gene O. Crawford
(74) Attorney, Agent, or Firm—Birch, Stewart, Kolasch & Birch, LLP

(57) ABSTRACT

A system for and a method of singulating parcels stored in a bulk into a single file of parcels that are mutually separated, by leading the parcels between consecutive, perpendicular conveyor sections by chutes that are designed for providing the desired spreading of parcels in a transport direction and/or the desired narrowing of the flow of parcels in a direction transverse to the transport direction. A first chute leads parcels from an input conveyor section to an intermediate conveyor section so that parcels having different transverse positions will tend to be spread in the transport direction when passing from the input conveyor section to the intermediate conveyor section. A second chute leads parcels from an intermediate conveyor section to a receiving conveyor section so that parcels subsequently will have a significantly reduced mutual spacing in the direction transverse to the transport direction of the receiving conveyor section.

15 Claims, 4 Drawing Sheets

PARCEL SINGULATION SYSTEM

This application claims benefit to provisional application 60/094,547 Jul. 29, 1998.

The present invention relates to a system for singulating articles as well as a method of singulating articles, such as parcels, which are stored in a bulk, into substantially a single file of articles that are mutually separated. In particular, the invention relates to a system in which the articles are lead between consecutive conveying sections by connecting means, such as e.g. chutes that are designed for providing the desired spreading of articles in a transport direction and/or the desired narrowing of the flow of articles in a direction transverse to the transport direction.

BACKGROUND OF THE INVENTION

It is known from the prior art to singulate articles from a bulk using different methods and systems. One method is to feed the articles through a rotating cone shaped housing provided with an inner helix or spiral as disclosed in WO 98/01379. A similar system is disclosed in EP 0 383 673 A1.

A second method is to convey the articles in such a way that they are induced to move transversal to the conveying direction toward one side of the conveyor from which side the articles may be removed in a singulated file as disclosed in U.S. Pat. No. 5,147,023 and in EP 0 616 961 A1.

A third method is to arrange a number of conveyor belts in such a manner that articles that are in excess at a position along a main transport path are returned to an upstream position so as to produce a single file of articles as disclosed in EP 0 795 497 A2, in EP 0 780 328 A1 and in U.S. Pat. No. 5,701,989.

A fourth method is disclosed in U.S. Pat. No. 5,641,052, in which a flow of packages is divided into a number of flows of which each is singulated by a plurality of inclined belts, each moving a received package upwards and over its peak to the next stage, thereby singulating the flow.

It is an object of the present invention to provide a system for and a method of singulating articles which are loaded in a bulk onto the system into a single file of articles.

It is a further object of the present invention to provide a system in which the article-supporting and article-conveying surfaces form a substantially contiguous surface so that the articles will not get stuck in openings or slots or get wedged by moving parts.

It is a still further object of the present invention to provide a system, wherein the processes leading to the desired re-organization of the articles are mainly performed at devices that do not comprise active drive means for driving the articles so as to provide a robust and reliable system.

It is a yet still further object of the present invention to provide monitoring means for monitoring the operation of the system and provide an output for a control system of said system that enables the control system to control the operation of the singulation system so as to prevent articles from being clustered along their transport path in the system.

DESCRIPTION OF THE INVENTION

The present invention concerns a system for singulating articles, the system comprising an input conveyor section having means for supporting and conveying articles in a transport direction of the input conveyor section and having an upstream receiving part and a downstream discharge part, a receiving conveyor section having means for supporting and conveying articles in a transport direction of the receiving conveyor section and having an upstream receiving part and a downstream discharge part, at least one intermediate conveyor section having means for supporting and conveying articles in a transport direction of the intermediate conveyor section and having an upstream receiving part and a downstream discharge part, at least two connecting means for leading articles from one conveyor section to the immediately succeeding conveyor section, a first of the connecting means leading articles from the downstream discharge part of the input conveyor section to the receiving part of a first of the at least one intermediate conveyor sections, the first connecting means leading articles in such a manner that a given article will have a travelling time between passing a reference line drawn perpendicular to the transport direction of the input conveyor section and reaching a reference line drawn perpendicular to the transport direction of the first intermediate conveyor section, which travelling time is dependent on the transverse position of the article at the downstream discharge part of the input conveyor section so that articles having different transverse positions will tend to be spread in the transport direction when passing from the input conveyor section to the first intermediate conveyor section, and a second of the connecting means leading articles from the downstream discharge part of one of the at least one intermediate conveyor sections to the upstream receiving part of the receiving conveyor section, the second connecting means leading articles in such a manner that articles having a mutual spacing in the direction transverse to the transport direction of said intermediate conveyor section will have a significantly reduced mutual spacing in the direction transverse to the transport direction of the receiving conveyor section when they have been lead by the second connecting means to the receiving conveyor section, the conveyor sections and connecting means of the system being arranged so that articles being placed on the article-supporting means of the input conveyor section will be conveyed to the article-supporting means of the receiving conveyor section during operation of the system.

The articles may be delivered to the input conveyor section in a bulk from a container, from a chute, from another conveyor section, etc., and the singulated articles may be transported away from the receiving conveyor section in a number of ways. The methods used for loading articles into the system and for unloading articles from the system are unimportant to the system and to the operation of the system.

The first and second connecting means are designed so that articles entering the connecting means will travel a distance at a speed, the distance and the speed combined giving a travelling time depending on the inlet position of the articles. The speed of the articles may be controlled by the properties of the article-supporting surface of the connecting means, either by increasing the friction at parts of the surface by giving it a higher roughness or a rubber covering, or by decreasing the friction at parts of the surface by giving it a low-friction covering, e.g. of polytetrafluoroethylene (Teflon) or by providing the parts of the surface with rollers or roller-ball racks. The speed of the articles may additionally or alternatively be controlled by the inclination of the article-supporting surface along the paths the articles are supposed to follow. The path of the respective article and thereby the travelling distance may be controlled by the inclination of the article-supporting surface perpendicularly to the path of the article. The speed and/or path of the articles may also be controlled by active drive means comprised in the connecting means.

According to one embodiment, the first connecting means comprises a number of parallel, narrow conveyor belts that convey articles at individual speed so that the speed of the belts is increasing from low speed at one side of the connecting means to high speed at the opposite side of the connecting means.

The means for supporting and conveying articles of the conveyor sections may comprise drive wheels or cylinders engaging with the articles, but preferably the means of at least one of the conveyor sections or alternatively of each of the conveyor sections comprises an endless belt for conveying articles and drive means for driving the endless belt, the endless belt forming an article-supporting surface of the conveyor section(s) in question.

In a preferred embodiment of the invention, at least one of the connecting means or alternatively each of the connecting means comprises a chute and the downstream discharge part of the conveyor section immediately preceding said connecting means is placed at a higher vertical level than the upstream receiving part of the conveyor section immediately succeeding said connection means. The chute is a connecting means without active drive means for driving the articles, thus the travelling time is mainly controlled by the inclination and length of the path that an article starting at a given position at an inlet end of the chute will follow. A connecting means that solely fulfills its function from the shape of its article-supporting surface is less likely to require maintenance and repair than one having active drive means and is thus more reliable.

The conveyor section immediately preceding a chute and the conveyor section immediately succeeding a chute may be arranged so that the transport directions of the two conveyor sections are substantially perpendicular to each other in order to make the arrangement less area-consuming and to accommodate a suitable form of the chute.

It has been found to be an advantage if the article-supporting means of the input conveyor section is inclined relatively to a horizontal plane in its transport direction so that articles are moved upwards by the conveyor section so as to induce articles situated on top of other articles placed on the article-supporting means to slide off said other articles in a direction opposite to the transport direction. The inclination of the article-supporting means of the input conveyor section relatively to a horizontal plane may depend on the surface properties of the articles as well as of the conveying means engaging with the articles. A preferred range of the inclination is 15–25 degrees but higher inclinations of 25–40 degrees may be suitable for articles with high-friction surface properties.

In a preferred embodiment of the system it comprises at least two intermediate conveyor sections and third connecting means for leading articles from the downstream discharge part of the first intermediate conveyor section to the upstream receiving part of the second of the intermediate conveyor sections, the third connecting means leading articles in such a manner that a given article will have a travelling time between passing a reference line drawn perpendicular to the transport direction of the first intermediate conveyor section and reaching a reference line drawn perpendicular to the transport direction of the second intermediate conveyor section, which travelling time is dependent on the transverse position of the article at the downstream discharge part of the first intermediate conveyor section so that articles having different transverse positions will tend to be spread in the transport direction when passing from the first intermediate conveyor section to the second intermediate conveyor section.

In a more preferred embodiment, the system comprises at least three intermediate conveyor sections and fourth connecting means for connecting the downstream discharge part of the second intermediate conveyor section to the upstream receiving part of a third of the intermediate conveyor sections, the fourth connecting means leading articles in such a manner that articles having a mutual spacing in the direction transverse to the transport direction of the second intermediate conveyor section will have a significantly reduced mutual spacing in the direction transverse to the transport direction of the third intermediate conveyor section when they have been lead by the fourth connecting means to the third intermediate conveyor section.

In order to monitor the operation of the system, at least one of the connecting means may comprise a plurality of sensing means each having a sensing area, the sensing areas being arranged near an inlet part of said connecting means in a row substantially transverse to the direction of transport of said connecting means at the position of the sensing means, each sensing means being in an activated state when an article is present in the sensing area of that sensing means and each sensing means being adapted to produce an output accordingly, the system comprising a control system having communication means adapted for detecting said outputs from said sensing means and the control system being enabled to control the operation of at least one of the conveying means according to said outputs.

The control system may further be adapted for changing the value of a variable stored in a storage means of the control system according to the outputs from said plurality of sensing means and a time factor so as to provide a measure of the amount of articles present on the connecting means, the control system being enabled to control the operation of at least one of the conveying means according to said value.

Preferably, the control system may be enabled to obtain data relating to the conveying speed of the conveyor section receiving articles from said connection means, the control system being adapted for changing the value of said variable according to said conveying speed and a time factor so as to provide a measure of the amount of articles present on the connecting means.

The monitoring device may be regarded as an independent aspect of the invention, that may be applied to a number of different conveying arrangements. Thus, the invention also regards a monitoring device comprising a plurality of sensing means each having a sensing area, the sensing areas being arranged in a row substantially transverse to the direction of transport of a device for transporting articles at the position of the sensing means, each sensing means being in an activated state when a transported article is present in the sensing area of that sensing means and each sensing means being adapted to produce an output accordingly, the monitoring device comprising a control system having communication means adapted for detecting said outputs from said sensing means and being adapted for providing a measure of the amount of articles passing said sensing areas from said outputs.

The present invention further regards a method of singulating articles from a bulk of articles, the method comprising the steps of (a) loading the articles onto an input conveyor section, (b) transporting the articles on the input conveyor section to a discharge part of the input conveyor section, (c) discharging the articles from the discharge part of the input conveyor section onto a first connecting means arranged for leading articles to a receiving part of a first intermediate conveyor section, (d) transporting the articles on the first connecting means in such a manner that a given article will have a travelling time between passing a reference line drawn perpendicular to a transport direction of the input conveyor section and reaching a reference line drawn perpendicular to a transport direction of the first intermediate conveyor section, which travelling time is dependent of the transverse position of the article at the downstream discharge part of the input conveyor section so that articles having different transverse positions will tend to be spread in a transport direction when passing from the input conveyor section to the first intermediate conveyor section, (e) receiving the articles from the first connecting means on the receiving part of the first intermediate conveyor section, (f) transporting the articles to a discharge part of an intermediate conveyor section, (g) discharging the articles from said intermediate conveyor section onto a second connecting means arranged for leading articles to a receiving part of a receiving conveyor section, (h) transporting the articles on the first connecting means in such a manner that articles having a mutual spacing in the direction transverse to a transport direction of said intermediate conveyor section will have a significantly reduced mutual spacing in the direction transverse to a transport direction of the receiving conveyor section when they have been lead by the second connecting means to the receiving conveyor section, and (i) receiving the articles from the second connecting means on the receiving part of the receiving conveyor section.

The bulk of articles may be loaded onto the input conveyor section as a two-dimensional layer of articles in the transport plane of the conveyor section, or the articles may be loaded as a three-dimensional layer so that articles may be placed on top of each other in the input conveyor section.

The transport according to step (b) may at least partly be performed in a plane inclined relatively to a horizontal plane so that articles are transported upwards by the input conveyor section in order to induce articles situated on top of other articles placed on article-supporting means of the input conveyor section to slide off said other articles in a direction opposite a transport direction of the input conveyor section.

Preferably, the inclination of the plane relatively to a horizontal plane is within the range of 15–25 degrees.

The transport according to step (b) may comprise the steps of (b1) operating conveying means of the input conveyor section so as to transport the articles in a transport direction of the input conveyor section, (b2) detecting outputs from a plurality of sensing means each having a sensing area, the sensing areas being arranged near an inlet part of said first connecting means in a row substantially transverse to the direction of transport of said first connecting means at the position of the sensing means, each sensing means being in an activated state when an article is present in the sensing area of that sensing means and each sensing means being adapted to produce an output accordingly, (b3) increasing the value of a variable stored in a storage means of a control system according to the outputs from said plurality of sensing means and a time factor, (b4) decreasing the value of the variable according to the conveying speed of the first intermediate conveyor section and a time factor, (b5) stopping the operation of the input conveyor section if the value of the variable exceeds a predetermined first threshold value.

Furthermore, the step (b5) may in a preferred embodiment be performed only if an article at the same time is present at a downstream discharge part of the input conveyor section.

The method may also further comprise the step of (b6) in case the operation of the input conveyor section has been stopped, the operation of the input conveyor section is started again only if no article is present at the receiving part of the first intermediate conveyor section.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF FIGURES

The present invention will become more fully understood from the detailed description given hereinbelow and the accompanying drawings which are given by way of illustration only, and thus are not limitative of the present invention, and wherein.

Figure 1:
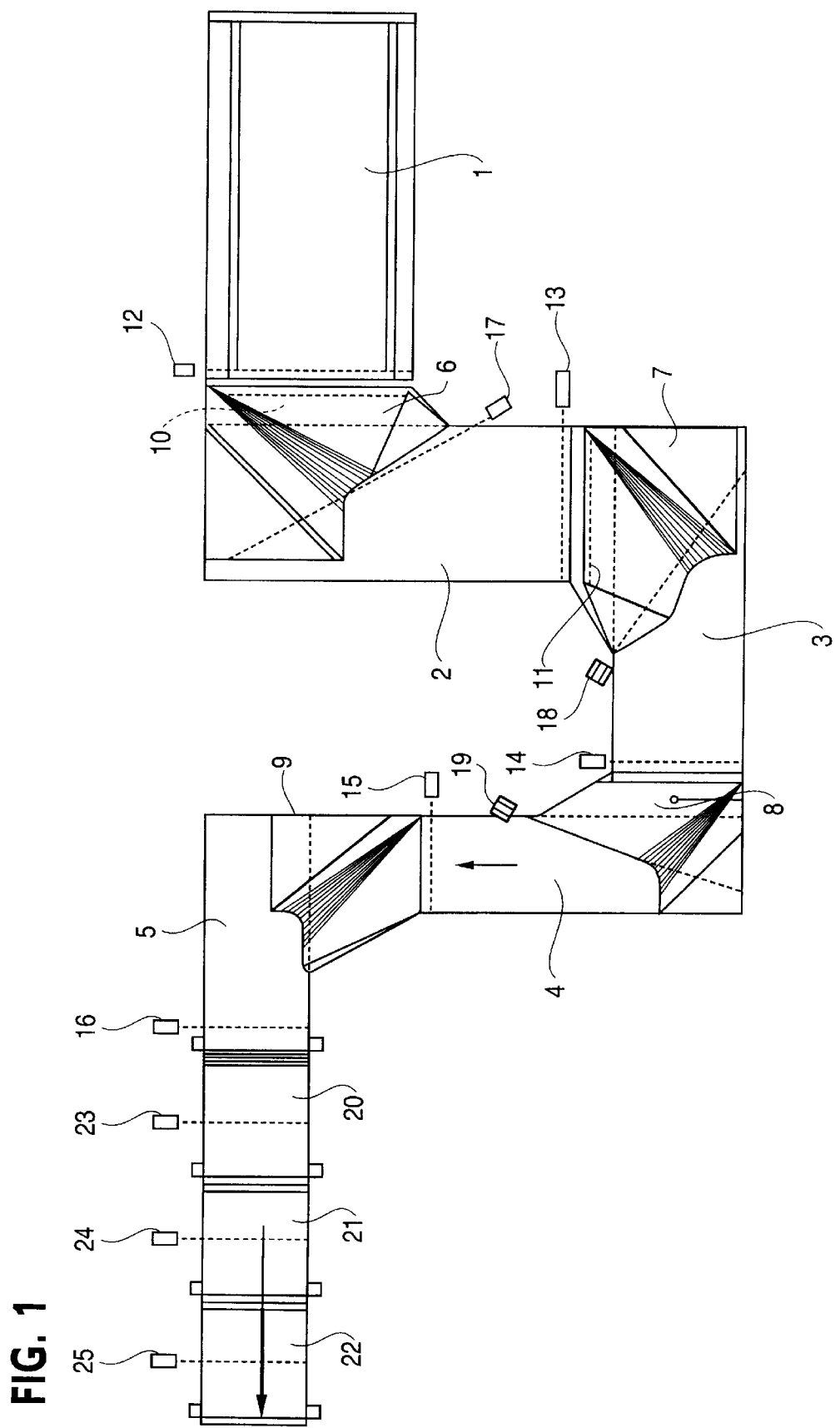
FIG. 1 is an overview of a system according to the invention as seen from above.

DETAILED DESCRIPTION OF FIGURES.

A system for singulation of articles, such as parcels, according to the present invention is presented in the figures. An overview of the system is given in FIGS. 1 and 2. The system comprises five belt conveyor sections 1–5 arranged in series, each succeeding conveyor section 2–5 being arranged substantially perpendicular to the immediately preceding conveyor section 14. Each conveyor section 1–5 comprises an endless belt forming an article-supporting surface and article-conveying means, and an asynchronous electric motor arranged for driving the endless belt. The downstream end in the transport direction of each preceding conveyor section 1–4 is situated at a higher vertical level than the article-receiving part of the immediately succeeding conveyor section 2–5 and immediately adjacent conveyor sections 1–5 are connected with chutes 6–9 so that articles may slide down the chutes 6–9 in order to move from one conveyor section 14 to the next conveyor section 2–5.

The system comprises a control system for controlling the operation of the singulator system. The control is exercised by activating or de-activating the operation of the endless belts of the conveyor sections 1–5 based on the input from the photo cells arranged at various positions along the system. A row of photo cells 10 is arranged across the upper end of the first chute 6 connecting the first conveyor section 1 and the second conveyor section 2 for monitoring the flow of articles past the row of photo cells 10. A similar row 11 30 is arranged across the upper end of the second chute 7 connecting the second conveyor section 2 and the third conveyor section 3. Each conveyor section 1–5 has a photo cell 12–16 arranged 2 millimeters above the belt near the downstream end and perpendicular to the direction of transport in order to monitor the presence of articles. Furthermore, each of the three first chutes 6–8 has a photo cell 17–19 arranged across the lower end of the chute for monitoring the presence of articles at this position.

The purpose of the system is to singulate articles from a bulk of articles into a single aligned flow of articles being individually separated with a suitable distance. The system is operated in the following way: Articles which are stored in a bulk are loaded onto the belt of first conveyor section 1 in a bulk, preferably when the conveying means of the first conveyor section 1 is running. The articles are transported to the downstream end of the first conveyor section 1 from which they slide along the first chute 6 down to the second conveyor section 2. The first chute 6 is designed so that articles slide at different speed and along different distances depending on the transverse position at which they enter the chute 6, the shortest passing time being for articles entering the chute 6 at the outermost position to the left as seen in the transport direction, so as to create a spreading of the articles on the second conveyor and to break up clusters of articles. The belt of the second conveyor section 2 runs with a higher speed than the belt of the first conveyor section 1 so that a longer distance between the articles may be provided in the direction of transport.

The articles are transported to the downstream end of the second conveyor section 2 from which they slide along the second chute 7 down to the third conveyor section 3. The second chute 7 is designed for spreading the articles in the transport direction on the belt of the third conveyor section as well as for narrowing the flow of articles in the direction transverse to the direction of transport. Thus, the second chute 7 is designed so that the time it takes for an article to pass the chute 7 depends on the transverse position at which the article enters the chute 7, and so that the articles will be affected to enter the third conveyor section 3 at a transverse position close to a longitudinal line of the third conveyor section 3. Again, the belt of the third conveyor section 3 runs faster than the belt of the second conveyor section 2.

The third and fourth chute 8, 9 are designed for narrowing the flow of articles in the direction transverse to the direction of transport and the belts of the fourth and fifth conveyor sections 4, 5 each runs faster than the belt of its preceding conveyor section. Thus, the flow of articles that leaves the fifth conveyor section 5 and enters the spacing conveyor sections 20–22 is a single aligned flow of articles that are individually separated. The function of the spacing conveyor sections 20–22 is to provide a suitable and uniform distance between adjacent articles and they are designed to carry one article at a time. Each of the spacing conveyor sections 20–22 is provided with a photocell 23–25 arranged 275 millimeters from the downstream edge of the section so that the control system may start and stop the individual spacing conveyor section 20–22 so as to provide a uniform minimum distance between adjacent articles.

It is important for successful operation of the singulator system that the control system is provided with means for preventing articles from being clustered at the lower part of the first chute 6. Such means may advantageously comprise a measure of the number of articles passing onto the first chute 6, which is obtained by the control system from scanning the row of photocells 10 every ten micro seconds. An account stored in a data storage unit of the control system is increased according to the number of activated photocells detected by the scanning. The account is at the same time decreased with a constant number per time unit in which the second conveyor section 2 is operating. The operation of the first conveyor section 1 is stopped if the account exceeds an upper threshold value and the photocell 12 at the downstream end of the first conveyor section 1 is activated. The operation of the first conveyor section 1 is also stopped if the operation of the second conveyor section 2 is stopped and the photocell 12 at the downstream end of the first conveyor section 1 is activated. The operation of the first conveyor section 1 is started again when the photo cell 17 at the end of the first chute 6 is no longer activated and the second conveyor section 2 is operating. The account is reset to a starting value at the starting moment of the operation of the first conveyor section 1.

The operation of the second conveyor section 2 is controlled similarly to the operation of the first conveyor section 1. The row of photocells 11 at the upper end of the second chute 7 is scanned, thus providing a measure of the number of articles passing onto the second chute 7 and the photocell 13 at the downstream end of the second conveyor section 2 and the photocell 18 at the end of the second chute 7 provide output signals that enable the control system to control the operation of the second conveyor section.

The flow of articles becomes more orderly the further downstream in the singulation system it gets, thus the need for monitoring means such as photocells becomes less at downstream positions. The third and fourth chute 8, 9 are not provided with a row of photocells at the upper end because the flow of articles is largely singulated when it reaches the third chute 8. The function of these chutes 8, 9 is as previously mentioned, to narrow the flow of articles down in the transverse direction into substantially a single row of articles with a spacing in between. Therefore, the operation of the third and fourth conveyor sections 3, 4 is controlled differently from the operation of the first and second conveyor sections 1, 2.

The operation of the third and fourth conveyor section 3, 4 is controlled so that the operation of the individual conveyor section 3, 4 is stopped if the immediately succeeding conveyor section 4, 5 is stopped and the photocell 14, 15 at the downstream end of the conveyor section 3, 4 in question is activated. The operation of the third conveyor section 3 is started again when the fourth conveyor section 4 is running and the photocell 19 at the end of the third chute 8 is not activated. The operation of the fourth conveyor section 4 is started again when the fifth conveyor section 5 is running. If it is detected from the output from the photocell 14, 15 at the downstream end of the conveyor section 3, 4 that the spacing between two consecutive articles is shorter than a predetermined distance, the operation of the conveyor section 3, 4 in question may be stopped for a short period of time after the first article has left the conveyor section in order to create a larger spacing in the transport direction between the articles.

The operation of the fifth conveyor section 5 and the spacing conveyor sections 20–22 is controlled so that an article is passed to a succeeding conveyor section 20–22 only if the photocell 23–25 of that succeeding conveyor section is not activated. An article passed from the fifth conveyor section 5 to the first spacing conveyor section 20 is conveyed until it activates the photocell 23. The operation of the first spacing conveyor section 20 is stopped if the photocell 24 of the succeeding conveyor section 21 is activated and the operation is started again when the photocell 24 is no longer activated, thus creating a minimum distance between adjacent articles that is about the size of the distance between the photocells 23–25 of adjacent spacing conveyor sections 20–22.

The conveying operations of the individual conveyor sections 1–5, 20–22 of the present embodiment of the invention is start/stop controlled and the conveying speeds are:

| | | |
|---|---|---|
| first conveyor section | 1 | 0.23 m/s |
| second conveyor section | 2 | 0.35 m/s |
| third conveyor section | 3 | 0.46 m/s |
| fourth conveyor section | 4 | 0.70 m/s |
| fifth conveyor section | 5 | 0.85 m/s |
| first spacing section | 20 | 1.40 m/s |
| second spacing section | 21 | 1.60 m/s |
| third spacing section | 22 | 1.80 m/s |

The conveying speed of the first and second conveyor sections 1, 2 may alternatively be varied between two levels, so that the first conveyor section 1 is running at the higher speed at normal operating conditions and the speed is changed to the lower speed when the account for the first chute 6 exceeds a first threshold value, thus preventing the operation of the first conveyor section from being stopped in most situations and providing a more smooth and continuous operation of the system. The conveying speed of the second conveyor section 2 may be controlled in a similar way, which has the consequence that the decrement of the account for the first chute 6 will have to be dependent on time units as well as the actual conveying speed of the second conveyor section 2. The conveying speed may of course be varied between a higher number of levels or it may be varied ungraduated.

The upper surface of the belt of the first conveyor section 1 is inclined 21 degrees relatively to a horizontal plane in its transport direction so that the articles are moved upwards by the conveyor section 1 when they are transported towards the first chute 6. By inclining the belt in this manner, articles that are situated on top of other articles placed on the belt are induced to slide off those other articles in a direction opposite to the transport direction and the articles that are loaded onto the first conveyor section 1 in a bulk are discharged to the first chute 1 mainly as a single layer of articles.

The second, third and fourth conveyor sections 2, 3, 4 are each inclined about 11 degrees relatively to a horizontal plane in their respective transport directions so that articles are moved upwards by all sections. These sections are inclined with the main purpose of reducing the total height of the system for singulation of articles.

Figure 2:
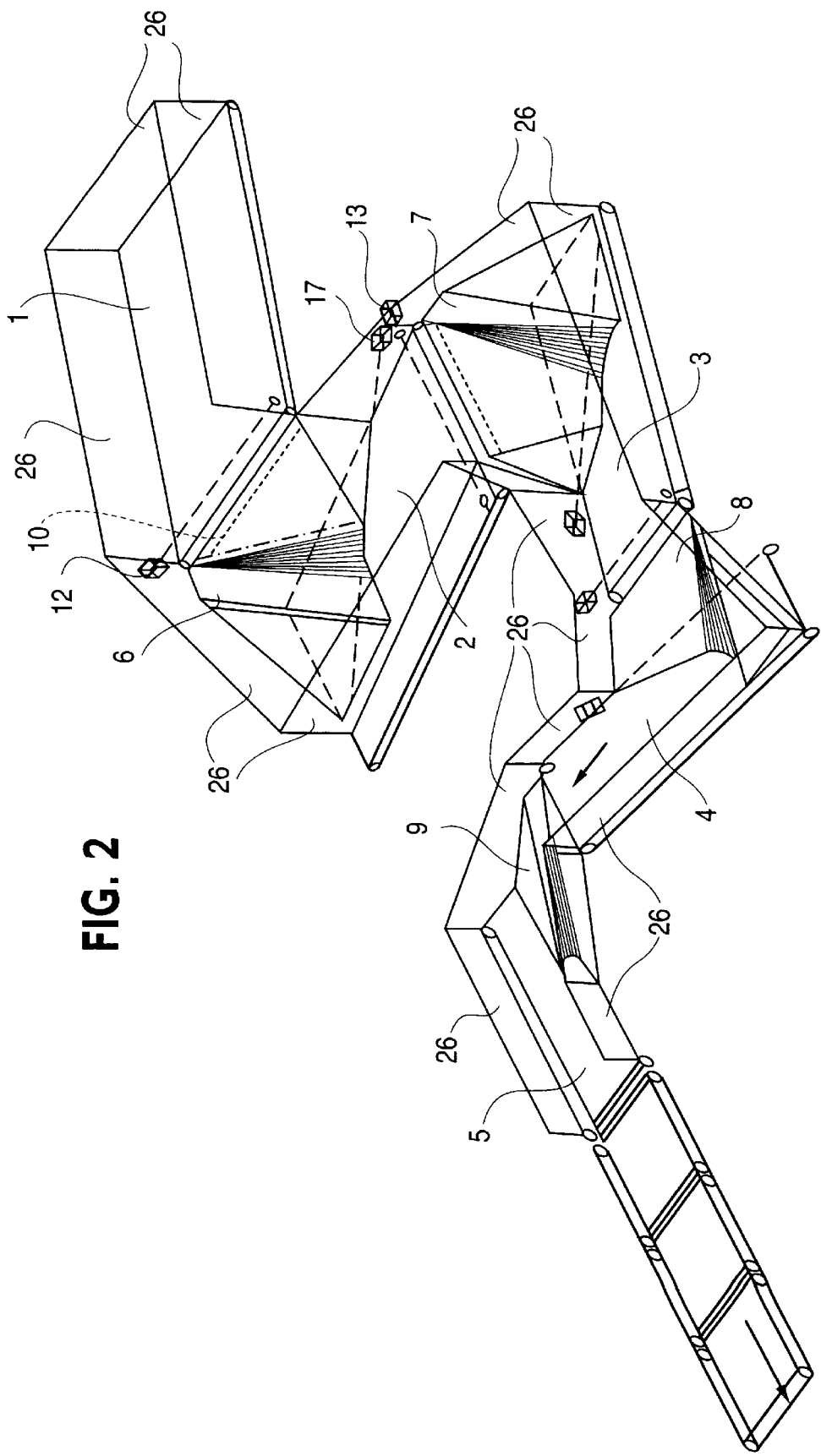
FIG. 2 is a perspective overview of the system.
Figure 3:
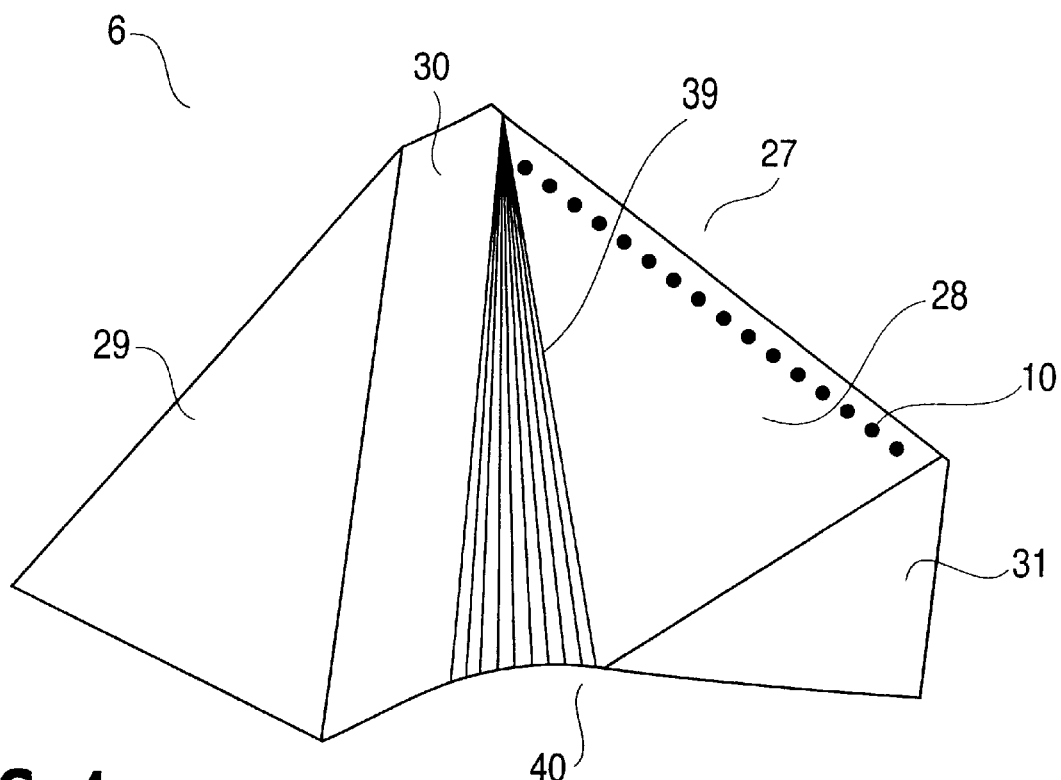
FIGS. 3–6 show details of the chutes incorporated in the system.
Figure 4:
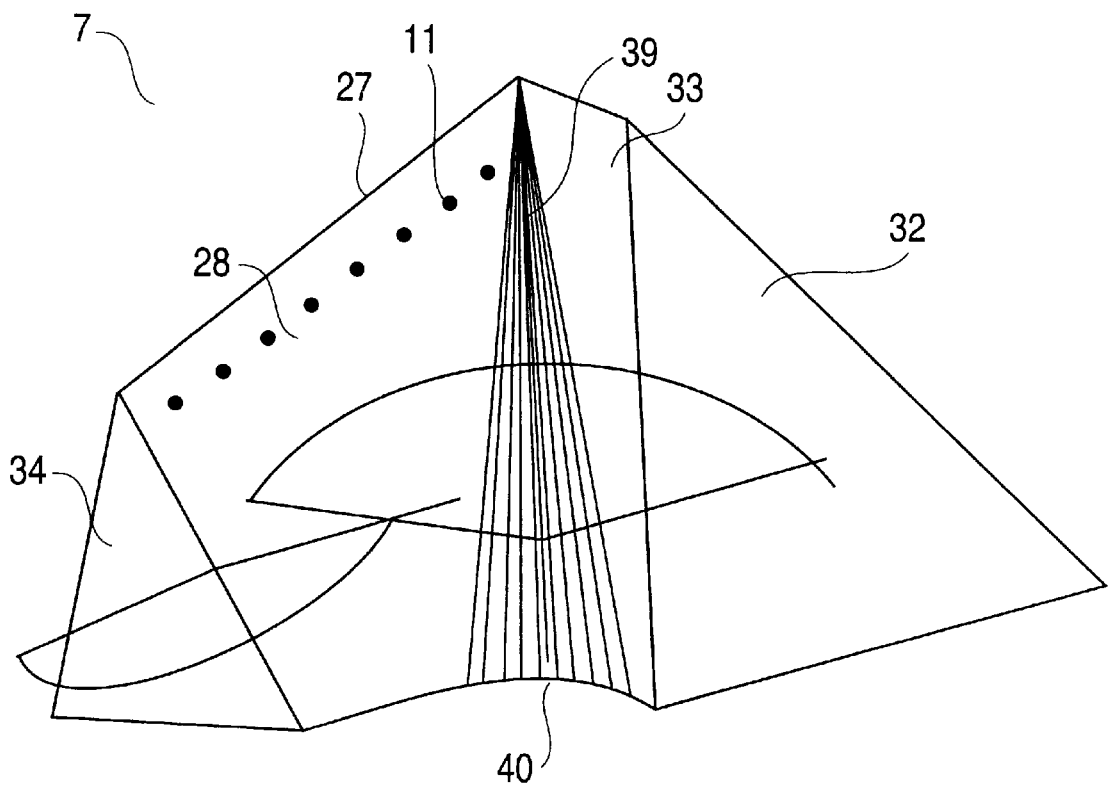
Figure 5:
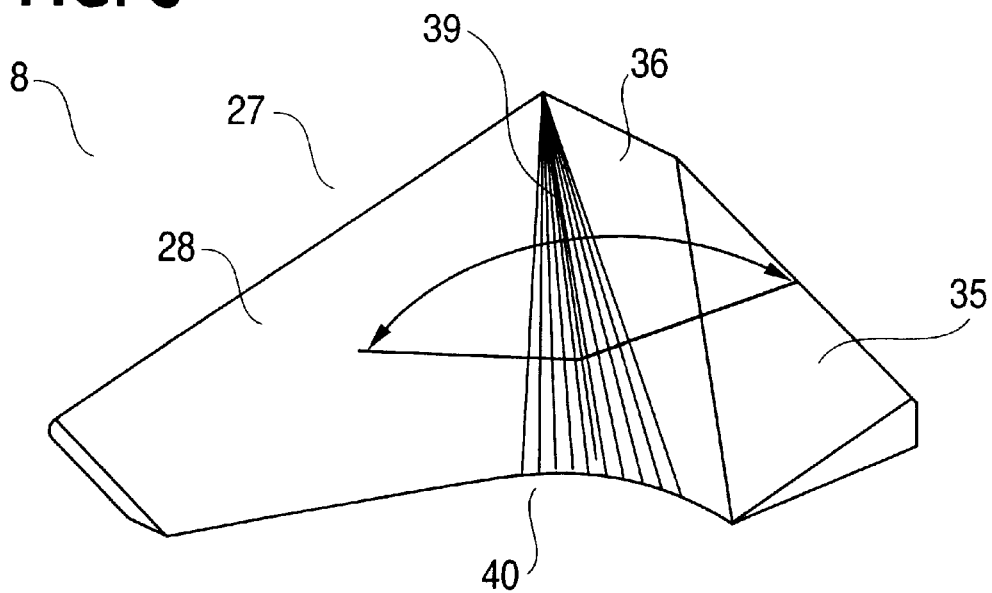
Figure 6:
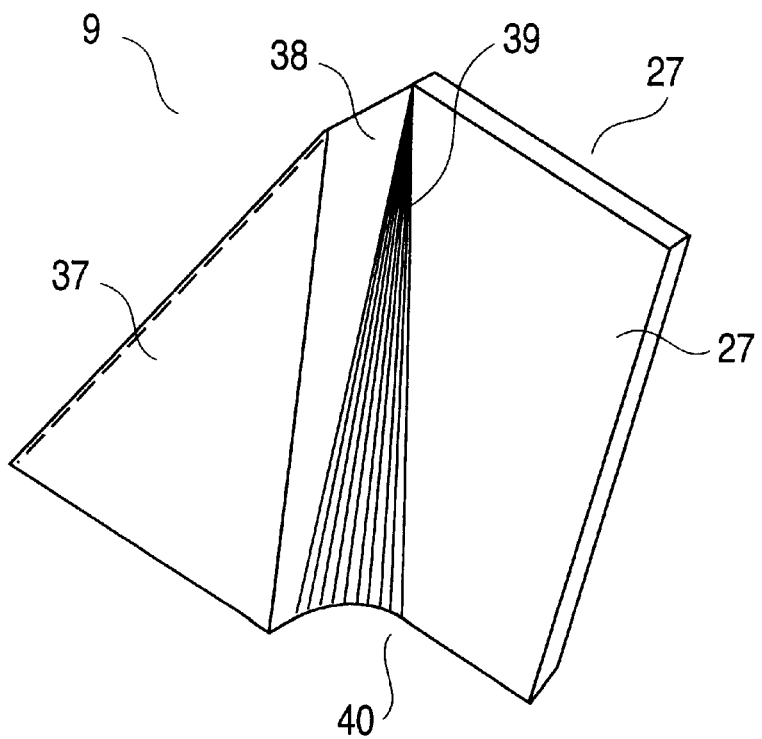

The system is equipped with side guards 26 along the path that the articles are following from the first conveyor section 1 to the fifth conveyor section 5 as can be seen from FIG. 2 in order to prevent articles from accidentally falling off the conveyor sections 1–5 or the chutes 6–9. Adjacent conveyor sections 1–5 and chutes 6–9 form a contiguous surface for supporting the articles so that the articles will not get stuck in openings or slots or get wedged by moving parts. This design of the article-supporting surface of the system together with the side guards 26 ensure a safe and careful handling of the articles with a very low risk that the articles are damaged by the system.

The dimensions of the conveyor sections 1–5, 20–22, in the present embodiment are for the first three conveyor sections 1–3 a length of 3020 millimeters and a width of 1780 millimeters, for the fourth and fifth conveyor sections 4–5 a length of 2495 millimeters and a width of 970 millimeters, and for the three spacing conveyor sections 20–22 a length of 995 millimeters and a width of 970 millimeters.

The design of the chutes 6–9 can partly be seen from the overview of the system in FIGS. 1 and 2 and are shown in more details in FIGS. 3–6. The function of each of the chutes 6–9 has been described previously. Each chute 6–9 has an upper edge 27 which is aligned with the discharge end of the previous conveyor section and which is arranged closely to that discharge end. The article-supporting surface of each chute 6–9 comprises a number of sliding surfaces that form a continuous surface having the properties with respect to inclination and length of travelling path for articles that make the chute suitable for its purpose. The primary sliding surface 28 of the chutes is a plane surface that for the first, second and third chutes 6–8 are inclined 28.5 degrees relatively to a horizontal plane and which for the fourth chute 9 is inclined 22 degrees. The chutes 6–9 each comprises a number of secondary plane sliding surfaces 29–38 and each comprises one inward conical rounded sliding surface 39. Finally, each chute 6–9 has a lower edge 40 from which the articles are delivered to the succeeding conveyor section.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for singulating articles, the system comprising:
    an input conveyor section having means for supporting and conveying articles in a transport direction of the input conveyor section and having an upstream receiving part and a downstream discharge part,
    a receiving conveyor section having means for supporting and conveying articles in a transport direction of the receiving conveyor section and having an upstream receiving part and a downstream discharge part,
    at least one intermediate conveyor section having means for supporting and conveying articles in a transport direction of the intermediate conveyor section and having an upstream receiving part and a downstream discharge part,
    at least two connecting means for leading articles from one conveyor section to the immediately succeeding conveyor section,
    a first of the connecting means leading articles from the downstream discharge part of the input conveyor section to the receiving part of a first of the at least one intermediate conveyor sections, the first connecting means leading articles in such a manner that a given article will have a traveling time between passing a reference line perpendicular to the transport direction of the input conveyor section and reaching a reference line perpendicular to the transport direction of the first intermediate conveyor section, which traveling time is dependent on the transverse position of the article at the downstream discharge part of the input conveyor section so that articles having different transverse positions will tend to be spread in the transport direction when passing from the input conveyor section to the first intermediate conveyor section, and a second of the connecting means leading articles from the downstream discharge part of one of the at least one intermediate conveyor sections to the upstream receiving part of the receiving conveyor section, the second connecting means leading articles in such a manner that articles having a mutual spacing in the direction transverse to the transport direction of said intermediate conveyor section will have a significantly reduced mutual spacing in the direction transverse to the transport direction of the receiving conveyor section when they have been lead by the second connecting means to the receiving conveyor section, the conveyor sections and conveying means of the system being arranged so that articles being placed on the article-supporting means of the input conveyor section will be conveyed to the article-supporting means of the receiving conveyor section during operation of the system, wherein at least one of the connecting means comprises a plurality of sensing means each having a sensing area, the sensing areas being arranged near an inlet part of said connecting means in a row substantially transverse to the direction of transport of said connecting means at the position of the sensing means, each sensing means being in an activated state when an article is present in the sensing area of that sensing means and each sensing means being adapted to produce an output accordingly, the system comprising a control system having communication means adapted for detecting said outputs from said sensing means and the control system being enabled to control the operation of at least one of the conveying means according to said outputs.

2. The system according to claim 1, wherein the means for supporting and conveying articles of at least one of the conveyor sections comprises an endless belt for conveying articles and drive means for driving the endless belt, the endless belt forming an article-supporting surface of the at least one of the conveyor sections.

3. The system according to claim 1, wherein at least one of the connecting means comprises a chute and the downstream discharge part of the conveyor section immediately preceding said connecting means is placed at a higher vertical level than the upstream part of the conveyor section immediately succeeding said connection means.

4. The system according to claim 3 wherein said conveyor section immediately preceding said connecting means and the conveyor section immediately succeeding said connection means are arranged so that the transport directions of the two conveyor sections are substantially perpendicular to each other.

5. The system according to claim 1, ,wherein the article-supporting means of the input conveyor section is inclined relative to a horizontal plane in its transport direction so that articles are moved upwards by the conveyor section so as to induce articles situated on top of other articles placed on the article-supporting means to slide off said other articles in a direction opposite the transport direction.

6. The system according to claim 5, wherein the inclination of the article-supporting means of the input conveyor section relative to a horizontal plane is within the range of 15–25 degrees.

7. The system according to claim 1, comprising at least two intermediate conveyor sections and third connecting means for leading articles from the downstream discharge part of the first intermediate conveyor section to the upstream receiving part of the second of the intermediate conveyor sections, the third connecting means leading articles in such a manner that a given article will have a traveling time between passing a reference line perpendicular to the transport direction of the first intermediate conveyor section and reaching a reference line perpendicular to the transport direction of the second intermediate conveyor section, which traveling time is dependent on the transverse position of the article at the downstream discharge part of the first intermediate conveyor section so that articles having different transverse positions will tend to be spread in the transport direction when passing from the first intermediate conveyor section to the second intermediate conveyor section.

8. The system according to claim 7, comprising at least three intermediate conveyor sections and fourth connecting means for connecting the downstream discharge part of the second intermediate conveyor section to the upstream receiving part of a third of the intermediate conveyor sections, the fourth connecting means leading articles in such a manner that articles having a mutual spacing in the direction transverse to the transport direction of the second intermediate conveyor section will have a significantly reduced mutual spacing in the direction transverse to the transport direction of the third intermediate conveyor section when they have been lead by the fourth connecting means to the third intermediate conveyor section.

9. The system according to claim 1, wherein a value of a variable stored in a storage means of the control system is changeable by the control system according to outputs from said plurality of sensing means and a time factor so as to provide a measure of an amount of articles present on the connecting means, operation of at least one of the conveying means being controllable by the control system according to said value.

10. The system according to claim 9, wherein data relating to the conveying speed of the conveyor section receiving articles from said connection means is obtainable by the control system, a value of said variable being changeable by the control system according to said conveying speed and a time factor so as to provide a measure of the amount of articles present on the connecting means.

11. A method of singulating articles from a bulk of articles, the method comprising the steps of:
  (a) loading the articles onto an input conveyor section,
  (b) transporting the articles on the input conveyor section to a discharge part of the input conveyor section,
  (c) discharging the articles from the discharge part of the input conveyor section onto a first connecting means arranged for leading articles to a receiving part of a first intermediate conveyor section,
  (d) transporting the articles on the first connecting means in such a manner that a given article will have a traveling time between passing a reference line perpendicular to a transport direction of the input conveyor section and reaching a reference line perpendicular to a transport direction of the first intermediate conveyor section, which traveling time is dependent on the transverse position of the article at the downstream discharge part of the input conveyor section so that articles having different transverse positions will tend to be spread in a transport direction when passing from the input conveyor section to the first intermediate conveyor section,
  (e) receiving the articles from the first connecting means on the receiving part of the first intermediate conveyor section, (f) transporting the articles to a discharge part of an intermediate conveyor section,
(g) discharging the articles from said intermediate conveyor section onto a second connecting means arranged for leading articles to a receiving part of a receiving conveyor section,
(h) transporting the articles on the first connecting means in such a manner that articles having a mutual spacing in the direction transverse to a transport direction of said intermediate conveyor section will have a significantly reduced mutual spacing in the direction transverse to a transport direction of the receiving conveyor section when they have been lead by the second connecting means to the receiving conveyor section, and
(i) receiving the articles from the second connecting means on the receiving part of the receiving conveyor section, wherein the transport according to step (b) comprises the steps of:
  (b1) operating a conveying means of the input conveyor section so as to transport the articles in a transport direction of the input conveyor system,
  (b2) detecting outputs from a plurality of sensing means, each having a sensing area, the sensing areas being arranged near an inlet part of said first connecting means in a row substantially transverse to the direction of transport of said first connecting means at the position of the sensing means, each sensing means being in an activated state when an article is present in the sensing area of that sensing means and an output being producible by each sensing means,
  (b3) increasing the value of a variable stored in a storage means of a control system according to the outputs from said plurality of sensing means and a time factor,
  (b4) decreasing the value of the variable according to the conveying speed of the first intermediate conveyor section and a time factor,
  (b5) stopping the operation of the input conveyor section if the value of the variable exceeds a predetermined first threshold value.

12. The method according to claim 11, wherein the step (b5) is performed only if an article at the same time is present at a downstream discharge part of the input conveyor section.

13. The method according to claim 11, further comprising the step of:
  (b6) in case the operation of the input conveyor section has been stopped, the operation of the input conveyor section is started again only if no article is present at the receiving part of the first intermediate conveyor section.

14. The method according to claim 11, wherein the transport according to step (b) at least partly is performed in a plane inclined relative to a horizontal plane so that articles are transported upwards by the input conveyor section in order to induce articles situated on top of other articles placed on article-supporting means of the input conveyor section to slide off said other articles in a direction opposite a transport direction of the input conveyor section.

15. The method according to claim 14, wherein the inclination of the plane relative to a horizontal plane is within the range of 15–25 degrees.

* * * * *